United States Patent
Gill

[11] Patent Number: 5,304,058
[45] Date of Patent: Apr. 19, 1994

[54] INJECTION NOZZLE

[75] Inventor: Antony Gill, Rochester, Mich.

[73] Assignee: Automotive Plastic Technologies, Sterling Heights, Mich.

[21] Appl. No.: 714,118

[22] Filed: Jun. 12, 1991

[51] Int. Cl.$^5$ .............................................. B29C 45/20
[52] U.S. Cl. .................................... 425/562; 425/564; 425/568; 425/584; 425/DIG. 224
[58] Field of Search ............. 425/542, 562, 564, 584, 425/146, 149, 568, DIG. 224; 137/625.47, 251

[56] References Cited

U.S. PATENT DOCUMENTS

| | | | |
|---|---|---|---|
| Re. 28,721 | 2/1976 | Farrell | 425/564 |
| Re. 30,335 | 7/1980 | Johansson | 425/548 |
| 3,191,233 | 6/1965 | Linderoth, Jr. | 425/562 |
| 3,218,375 | 11/1965 | Hardwick | 425/562 |
| 3,684,241 | 8/1972 | Hartmann et al. | 137/625.47 |
| 3,819,313 | 6/1974 | Jusephsen et al. | 425/564 |
| 4,082,226 | 4/1978 | Appleman et al. | 239/584 |
| 4,099,904 | 7/1978 | Dawson | 425/563 |
| 4,101,617 | 7/1978 | Friederich | 264/93 |
| 4,213,747 | 7/1980 | Friedrich | 425/146 |
| 4,441,524 | 4/1984 | Mese | 137/625.47 |
| 4,572,239 | 2/1986 | Koch et al. | 137/625.47 |
| 4,685,881 | 8/1987 | Sasaki | 425/562 |
| 4,781,554 | 11/1988 | Hendry | 425/4 R |
| 4,824,732 | 4/1989 | Hendry et al. | 428/542.8 |
| 4,855,094 | 8/1989 | Hendry | 425/562 |
| 4,905,901 | 3/1990 | Johnson | 239/135 |
| 4,915,133 | 4/1990 | Harrison | 137/625.47 |
| 4,935,191 | 6/1990 | Baxi | 264/572 |
| 4,942,006 | 7/1990 | Loren | 264/50 |
| 4,943,407 | 7/1990 | Hendry | 264/572 |
| 4,952,132 | 8/1990 | Lundquist | 425/562 |
| 4,990,083 | 2/1991 | Bernhardt | 425/547 |
| 5,015,166 | 5/1991 | Baxi | 425/149 |
| 5,028,377 | 7/1991 | Hendry | 264/572 |
| 5,057,255 | 10/1991 | Sato et al. | 425/562 |
| 5,118,455 | 6/1992 | Loren | 425/149 |
| 5,149,547 | 9/1992 | Gill | 425/564 |

Primary Examiner—Jay H. Woo
Assistant Examiner—Duane S. Smith
Attorney, Agent, or Firm—Howard & Howard

[57] ABSTRACT

An apparatus for gas assisted injection molding is shown including a source of injection gas and a source of molten plastic or synthetic resin material. The apparatus includes an injection nozzle with a minimum of moving parts. The injection nozzle includes a nozzle body portion having an axially extending bore therethrough for establishing a flow path. A valve chamber is provided in the axially extending bore, and a spherical valve is mounted in the valve chamber for rotation between a first position in which a first flow path is established, and a second position in which a second flow path is established. A sealing member sealingly mounts the spherical valve in the valve chamber, and means to activate the spherical valve are included.

8 Claims, 1 Drawing Sheet

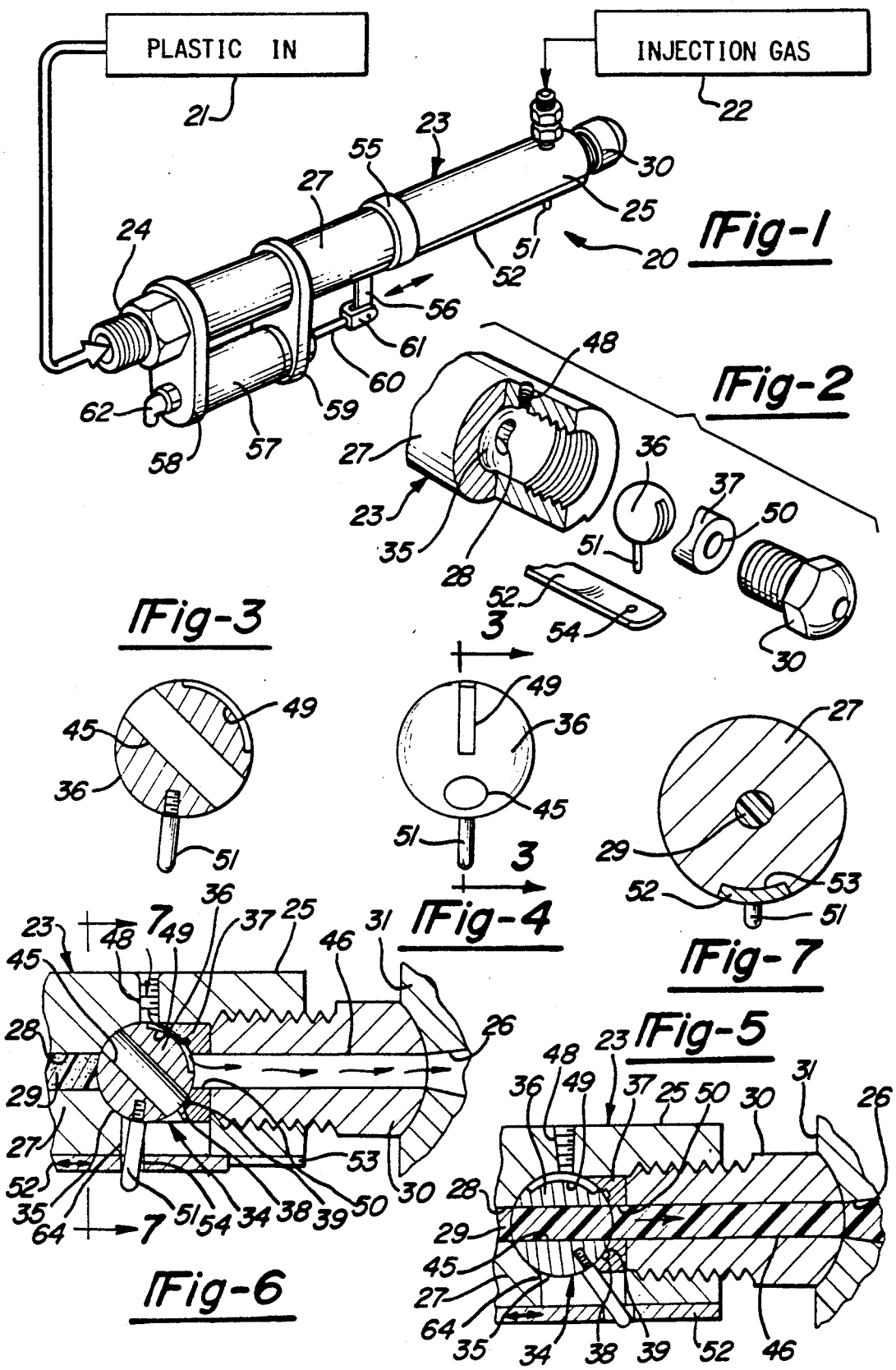

INJECTION NOZZLE

BACKGROUND OF THE INVENTION

1. Field of the Invention

The present invention relates to injection molding apparatus and parts therefore. More particularly the invention relates to an improved apparatus having an injection or shut off nozzle which is greatly simplified in construction and uses a minimum of moving parts.

2. Description of the Prior Art.

Gas-assisted injection molding is known in the art as a preferred way of making larger and more complicated parts without having the problems of sink marks and the like in thick rib sections or when complicated cross-sections are involved. In gas-assisted injection molding these large and complicated parts are made of a hollow construction by injecting a fluid or gas into the interior of a part while it is being formed in a mold cavity. It is known that the gas or fluid which is injected into the interior of the mold cavity will follow the path of least resistance. Since it is well known that the molten plastic will generally cool and harden from the outside inwardly, the gas will penetrate the inner, softer, and warmer portions of the part, which would normally be found in the thicker sections where there is a structural rib, etc. By following this path there is created a hollow within the plastic, and that hollow could be expanded by the addition of pressure outwardly to fill the mold cavity. It is known that if the gas pressure is held at an effectively constant level while the plastic part cools, the surface finish of the plastic part will be greatly enhanced by the minimization or elimination of sink marks, etc.

However, along with the idea of the injection of the gas or fluid came the need to vent the gas to relieve the pressure within the part before the mold could be opened. Many solutions were tried to discover a satisfactory way of introducing the gas into the interior of the plastic part, and then to vent the gas before opening the mold cavity.

One such apparatus for venting the gas before opening the mold cavity is described in U.S. Pat. No. 4,943,407 issued Jul. 24, 1990 to James W. Hendry. This is the closest prior art of which Applicant is aware. Generally this invention involves venting the gas to atmosphere through a specialized sprue bushing in which the sprue bushing includes a first body part in which a second body part or cylindrical pin is mounted for movement upon the activation of an actuator. The pin has two flow paths which are alternately used. One path allows the passage of plastic through the sprue bushing into the sprue. The second path allows injection or venting of gas from the interior of the associated mold cavity.

However, mold sprues are generally small, and the moving parts thereof which allow the injection of plastic and gas alternately have proven to be difficult to deal with. In addition, the providing of these special sprue valves adds significantly to the cost of the molds.

Thus, Applicant's assignee, to eliminate the problems in the prior art, developed the idea of venting through the injection nozzle, which is a larger device, can be more easily manufactured, and can serve multiple molds. Such a nozzle is described in co-pending U.S. Letters Patent Application Ser. No. 07/628,746, filed on Dec. 17, 1990, now U.S. Pat. No. 5,200,127 and assigned to the common assignee of the present invention.

SUMMARY OF THE INVENTION

In accordance with the present invention, there is provided an apparatus for gas-assisted injection molding having an injection nozzle with a minimum of moving parts. This apparatus produces an injection molded article by introducing a stream of molding material from a source of molten plastic through an injection nozzle into an article forming mold space. After the desired amount of material has been injected to fill the mold cavity, the flow through the injection nozzle is shut off, and replaced by a pressurized fluid or gas flow. After the gas is injected the molded article is allowed to at least partially cool while the article is under pressure. When the plastic article has cooled sufficiently to be self-supporting, the gas within it is vented to atmosphere through the same passages by which it entered the mold cavity.

The injection or shut off nozzle in the apparatus includes a nozzle body having an upstream end for communication with an end of an associated injection molding machine, and a downstream end for fluid communication with a sprue of an associated mold body. Between the upstream end and the downstream end is provided an axially extending bore, which may be of cylindrical or other cross-section. A valve chamber is provided in the bore, and has a rotatable valve member which completes a first flow path, when in a first position, for the molten plastic material, and a second flow path, when in a second position, to provide a flow path for the injection gas.

In one embodiment of the invention there is provided a source of molten plastic, an injection or shut-off nozzle, and a source of injection gas.

In another modification of the present invention an injection nozzle is provided having a minimum of parts. Said injection nozzle includes a nozzle body having an upstream end for communication with an end of an associated injection molding machine, and a downstream end for fluid communication with a sprue of an associated mold body. The nozzle body includes an axially extending bore for establishing a flow path, a valve chamber near the downstream end of the axially extending bore, and in fluid communication therewith, and a second bore in fluid communication with said valve chamber. A spherical or ball-shaped valve mounted in the valve chamber is rotatable between a first position and a second position. When the valve is in its first position, a continuous flow path from the injection molding machine to the mold sprue is provided for the molten plastic material. When the valve is in its second position a portion of the first flow path is blocked and a flow path from a source of gas to the mold sprue is activated.

Thus, one of the objects of the present invention is to provide an apparatus for gas-assisted injection molding which provides for injection of molten plastic or resin material into a mold cavity through a first injection path. This is followed by a halting of the resin injecting process, and replacement thereof with an injection of a pressurized fluid or gas through a second flow path.

A further object of the present invention is to provide an improved gas-assisted injection molding apparatus where a "sprue break" is not necessary for venting the gas within the molded article before opening the mold cavity.

A still further object of the present invention is to provide an apparatus for replacing the flow of molten plastic with a flow of injection gas without utilizing the mold sprue.

A still further object of the present invention is to provide an improved injection molding nozzle for use in apparatus of the foregoing kind.

Another object of the present invention is to provide an injection nozzle for use in injection molding equipment having a minimum of moving parts.

Further objects and advantages of this invention will be apparent from the following description and appended claims, reference being had to the accompanying drawings forming a part of the specification, wherein like reference characters designate corresponding parts in the several views.

BRIEF DESCRIPTION OF THE DRAWINGS

FIG. 1 is a diagrammatic view of a construction embodying the present invention, including a source of molten plastic, an injection nozzle, and a source of injection gas.

FIG. 2 is a partial, exploded, view of the downstream end of the injection nozzle of FIG. 1, showing the valve chamber and valve member utilized in the construction of the present invention.

FIG. 3 is a sectional view, taken in the direction of the arrows, along the section line 3—3, of FIG. 4.

FIG. 4 is an elevational view of the valve member shown in FIG. 2.

FIG. 5 is a partial cross-sectional view of the downstream end of the injection nozzle shown in FIGS. 1 and 2, showing the valve member in a first position with a first flow path established.

FIG. 6 is a view similar to FIG. 5, but showing the spherical valve or valve member in a second position with a second flow path established.

FIG. 7 is a sectional view, taken in the direction of the arrows, along the section line 7—7, of FIG. 6.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DESCRIPTION OF THE PREFERRED EMBODIMENTS

Referring now to FIG. 1, there is shown an injection molding apparatus 20 including a source of molten plastic or plastic resin 21, a source of injection fluid or gas 22, and an injection nozzle 23. The injection nozzle 23 has an upstream end 24 for communication with an end of an associated injection molding machine (not shown), and a downstream end 25 for fluid communication with a sprue 26 of an associated mold body 27 through nozzle tip 30 (FIGS. 5 and 6).

Referring now to FIGS. 2, 5 and 6 it can be seen that the injection nozzle 23 has a nozzle body portion 27 having an axially extending bore 28 therein for establishing a flow path for the molten plastic or synthetic resin 29. At or near the downstream end of the axially extending bore 28 is a valve chamber 34 having a front wall 35 complementary in shape to the spherical valve or ball-shaped valve member 36. The valve chamber 34 is closed by a sealing member 37 having an O-ring or other sealing means 38 carried in grooves 39 to provide a seal between the surface of the spherical valve 36 and the sealing member 37 for purposes to be described hereinafter.

Referring now specifically to FIG. 5, the valve member 36 is shown in its first position wherein it forms a first flow path consisting of the axially extending bore 28, the diametral bore 45 in the valve member 36 and the nozzle passage 46 in the nozzle tip 30. From there the molten or synthetic resin 29 passes into the sprue 26.

Referring to FIG. 6, the valve member 36 is shown in its second position, wherein a second flow path is established in communication with said second bore 48 which is in fluid communication with said source of injection gas 22. The second flow path for the injection gas is formed by the second bore 48, the arcuate groove 49 provided in the surface of the valve member 36, the opening 50 in the sealing member 37, and the nozzle passage 46 in the nozzle tip 30.

By moving the valve member 36 to its second position, not only is the second flow path established for the injection gas, but because of the tilting of the diametral bore 45, the first flow path is blocked. No further synthetic resin or molten plastic 29 can flow through the nozzle tip 30.

The valve member 36 is rotated by the valve control pin 51, which reciprocates back and forth in a slot 64 in the nozzle body 27. The valve control pin 51 is reciprocated back and forth to move the spherical valve or ball-shaped valve member 36 from its first position, in which said first flow path is formed as shown in FIG. 5, to its second position, in which said second flow path is formed, as shown in FIG. 6. This is done by slider 52, which reciprocates back and forth in a recess 53 provided in the nozzle body 27. The valve control pin 51 is engaged by a hole 54 in the slider 52. The slider 52 is restrained for movement in the recess 53 by the band 55. An arm 56 is provided on the upstream end of the slider. To reciprocate the arm 56 there is provided a cylinder 57, fixedly mounted to the nozzle body 27 by an upper cylinder bracket 58, and a lower cylinder bracket 59. A cylinder shaft 60 is connected to the cylinder 57 to translate the reciprocating motion of the cylinder to the linkage adapter 61, which is connected to the arm 56. The cylinder 57 operates by means well known in the art by air or fluid admitted under pressure through air supply port 62.

It can now be understood that the O-ring or other sealing means 38, carried in the grooves 39 of the sealing member 37, are necessary to make certain there is no possibility of gas pressure travelling back through the first flow path and back to the injection ram or source of plastic 21.

The valve member 36, if ball-shaped, may have a circular, oval, or other cross-section as long as it is symmetrical about at least one axis of rotation.

Thus by carefully analyzing the problems present in the prior art injection nozzles, I have invented a novel construction which has eliminated serious problems in the art and has provided a simplified construction having a minimum number of moving parts. The moving parts which are present have been moved as far downstream as possible to eliminate, as much as possible, any concern that the small amount of aeriated resin that will be first injected into the mold after the end of any mold cycle will affect the quality of the molded parts.

I claim:

1. A nozzle for use in injection molding machines, said nozzle including;
   a) a nozzle body having an upstream end for communication with an end of an associated injection molding machine, and a downstream end for fluid communication with a sprue of an associated mold body, said nozzle body including:
      i) an axially extending bore for establishing a flow path,
      ii) a valve chamber provided in said axially extending bore and in fluid communication therewith, and
      iii) a second bore in fluid communication with said valve chamber;
   b) a spherical valve mounted in said valve chamber for rotation between a first position and a second position, wherein when said valve is in said first position, a first flow path is established between said upstream end and said downstream end of said nozzle body, and when said spherical valve is in its second position, a second flow path is established which provides fluid communication between said second bore and said downstream end of said nozzle body, while blocking said first flow path, and wherein said spherical valve includes a sphere, said sphere including:
      i) a diametral bore used to establish fluid communication between said upstream end and said downstream end of said nozzle body when said spherical valve is in said first position, and
      ii) an arcuate recess provided in the surface of said sphere to provide communication between said second bore and said downstream end of said nozzle body when said spherical valve is in said second position,
   c) a sealing member sealingly mounting said spherical valve in said valve chamber, said sealing member having a bore therein to allow fluid communication between said valve chamber and said downstream end of said nozzle body,
   d) means to activate said spherical valve, and
   e) said second bore adapted for communication with a pressurized gas source.

2. The injection nozzle defined in claim 1, wherein said actuation means include:
   a) a valve control pin attached to said sphere, and
   b) a device connected to said valve control pin to reciprocate said pin to move said spherical valve between said first and said second position.

3. The injection nozzle defined in claim 2, wherein said device to reciprocate includes:
   a) a fluid operated cylinder having a cylinder shaft for reciprocating motion,
   b) a linkage adapter connected to an end of said cylinder shaft, and
   c) a linkage connected between said linkage adapter and said valve control pin.

4. The injection nozzle defined in claim 3, wherein said device to reciprocate further includes:
   a) an upper cylinder bracket attached to said nozzle body, and
   b) a lower cylinder bracket attached to said nozzle body, said cylinder being fixedly attached to said nozzle body by said upper and said lower cylinder brackets.

5. The injection nozzle defined in claim 4, wherein said linkage further includes:
   a) a slider confined for reciprocal movement and having a hole therein engaging said valve control pin.

6. The injection nozzle defined in claim 5, and further including:
   a) a nozzle tip mounted in said cylindrical bore at the downstream end thereof.

7. The nozzle as recited in claim 1, wherein said upstream end of said nozzle body being connected to an injection molding machine, and said second bore being connected to a pressurized gas source.

8. A nozzle for use in injection molding machines, said nozzle including:
   a) a nozzle body having an upstream end for communication with an end of an associated injection molding machine, and a downstream end for fluid communication with a sprue of an associated mold body, said nozzle body including:
      i) an axially extending bore for establishing a flow path
      ii) a valve chamber provided in said axially extending bore and in fluid communication therewith, and
      iii) a second bore in fluid communication with said valve chamber;
   b) a spherical valve mounted in said valve chamber for rotation between a first position and a second position, wherein when said valve is in said first position, a first flow path is established between said upstream end and said downstream end of said nozzle body, and when said spherical valve is in its second position, a second flow path is established which provides fluid communication between said second bore and said downstream end of said nozzle body, while blocking said first flow path, and wherein said spherical valve includes a sphere, said sphere including:
      i) a diametral bore used to establish fluid communication between said upstream end and said downstream end of said nozzle body when said spherical valve is in said first position, and
      ii) an arcuate recess provided in the surface of said sphere to provide communication between said second bore and said downstream end of said nozzle body when said spherical valve is in said second position,
   c) a sealing member sealingly mounting said spherical valve in said valve chamber, said sealing member having a bore therein to allow fluid communication between said valve chamber and said downstream end of said nozzle body,
   d) means to activate said spherical valve, and
   e) said diametral bore and said arcuate recess are separate, such that when said spherical valve is in said first position, said second bore is not communicated to said downstream end of said nozzle body, and said arcuate recess does not communicate with said downstream end of said nozzle body, and when said spherical valve is in said second position, said upstream end is not communicated to said downstream end, and said diametral bore does not communicate with said upstream end.

* * * * *